(12) United States Patent
Duffy et al.

(10) Patent No.: US 8,495,329 B2
(45) Date of Patent: Jul. 23, 2013

(54) TYPE SYSTEM SUPPORT FOR MEMORY ISOLATION PERMISSIONS

(75) Inventors: John J. Duffy, Renton, WA (US); Steven Edward Lucco, Bellevue, WA (US); Anders Hejlsberg, Seattle, WA (US); Martin Taillefer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 12/422,764

(22) Filed: Apr. 13, 2009

(65) Prior Publication Data

US 2010/0262801 A1 Oct. 14, 2010

(51) Int. Cl.
*G06F 12/00* (2006.01)
*G06F 13/00* (2006.01)
*G06F 13/28* (2006.01)

(52) U.S. Cl.
USPC ............ 711/168; 711/164; 711/147; 707/704

(58) Field of Classification Search
USPC ......................... 711/164, 168, 147; 707/704
See application file for complete search history.

(56) References Cited

U.S. PATENT DOCUMENTS

| | | | | |
|---|---|---|---|---|
| 5,075,845 | A * | 12/1991 | Lai et al. | 711/152 |
| 5,682,537 | A * | 10/1997 | Davies et al. | 710/200 |
| 6,182,277 | B1 | 1/2001 | DeGroot et al. | |
| 7,209,918 | B2 * | 4/2007 | Li | 1/1 |
| 7,240,331 | B2 | 7/2007 | Vion-Dury et al. | |
| 2002/0107874 | A1 * | 8/2002 | DeLorme et al. | 707/200 |
| 2003/0135576 | A1 * | 7/2003 | Bodin | 709/213 |
| 2006/0248131 | A1 | 11/2006 | Marwinski et al. | |
| 2007/0130621 | A1 | 6/2007 | Marinescu et al. | |
| 2008/0313613 | A1 | 12/2008 | Bierhoff et al. | |

FOREIGN PATENT DOCUMENTS

| | | |
|---|---|---|
| KR | 1019980079611 A | 11/1998 |
| WO | 0203198 A2 | 1/2002 |
| WO | 2006039239 A1 | 4/2006 |

OTHER PUBLICATIONS

Bierhoff, Kevin and Aldrich, Jonathan; "Modular Typestate Checking of Aliased Objects", Oct. 2007.*
Garg, et al., "Type-Directed Concurrency", retrieved at <<http://citeseerx.ist.psu.edu/viewdoc/summary?doi=10.1.1.61.1659>>, pp. 1-15.
Boyapati, et al., "Ownership Types for Safe Programming: Preventing Data Races and Deadlocks", retrieved at <<http://www.eecs.umich.edu/~bchandra/publications/oopsla02.pdf>>, ACM Conference on Object-Oriented Programming, Systems, Languages and Applications (OOPSLA), Nov. 2002, pp. 211-230.
Aditya, et al., "A Type System for Functional Imperative Programming (Technical Summary)", retrieved at <<http://csg.csail.mit.edu/pubs/memos/Memo-368/memo-368.pdf>>, Jul. 1994, pp. 19.

(Continued)

*Primary Examiner* — Stephen Elmore
*Assistant Examiner* — Mark Giardino, Jr.

(57) ABSTRACT

An object reference is tagged with an isolation permission modifier. At least two permissions can be included, and in an example three permissions are included. In implementing the permissions, type modifiers for controlling access to type members through references pointing at an object are defined. One of the type modifiers is associated with each occurrence of a type name. Each of the of type modifiers defines a different access permission to restrict operations on the object to which the reference points.

20 Claims, 3 Drawing Sheets

OTHER PUBLICATIONS

Gifford, et al., "Integrating Functional and Imperative Programming", retrieved at <<http://delivery.acm.org/10.1145/320000/319848/p28-gifford.pdf?key1=319848&key2=3891481321&coll=GUIDE&dl=GUIDE&CFID=17666327&CFTOKEN=64628890>>, ACM, 1986, pp. 28-38.

Beckman, Nels E., "Verifying Correct Usage of Atomic Blocks using Access Permissions", retrieved at <<http://www.cse.unl.edu/~grother/isstadoc-papers/beckman.pdf>>, pp. 4.

Flanagan, et al., Types for Safe Locking, retrieved at <<http://citeseerx.ist.psu.edu/viewdoc/summary?doi=10.1.1.36.849>>, pp. 18.

"International Search Report", Mailed Date: Nov. 4, 2010, Application No. PCT/US2010/029716, Filed Date: Apr. 1, 2010, pp. 6.

"Written Opinion", Mailed Date: Nov. 4, 2010, Application No. PCT/US2010/029716, Filed Date: Apr. 1, 2010, pp. 4.

Zibin, Yoav et al., "Object and Reference Immutability Using Java Generics," Proceedings of the 6th Joint Meeting of the European Software Engineering Conference and the ACM Sigsoft Symposium on the Foundations of Software Engineering, pp. 10 (Jan. 2007).

The Supplemental European Search Report for Application No. EP 10 76 4898 mailed Dec. 18, 2012 (9 pgs).

* cited by examiner

TYPE SYSTEM SUPPORT FOR MEMORY ISOLATION PERMISSIONS

BACKGROUND

Concurrent programming for shared-memory multiprocessors can include the ability for multiple threads to access the same data. The multiple threads execute on multiple processors, multiple processor cores, or other classes of parallel hardware architecture involving a memory system shared among the processors. The shared-memory model is the most commonly deployed method of multithreaded communication. In such systems, concurrent threads can attempt to access and modify the same data in the shared-memory and often implement functionality using modifications to memory locations and input/output on real shared hardware devices. Both techniques are called side effects. Side effects can lead to race conditions and other undesired effects in concurrent programming, due to simultaneous access to these shared resources.

A major difficulty in implementing concurrent programming involves regulating access to these shared resources to avoid undesired effects. Developers often rely on a form of synchronization for concurrency safety. Synchronization often involves the use of locks, which is a form of pessimistic concurrency control mechanism that ensures data cannot be simultaneously accessed; this guarantees that one thread reading data won't see state as it is being updated by another. Synchronization provides safety often at the expense of performance and scalability. Newer synchronization technologies, such as those based on optimistic concurrency control (like Software Transaction Memory) provide superior performance and scalability than locks. But all contemporary synchronization mechanisms, even optimistic concurrency control, eventually cause issues in concurrent programming: when threads wait for another, scalability drops; shared-memory systems use caches whose performance drops significantly when threads share access to memory; and so on.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An object reference is tagged with an isolation permission modifier, which indicates what recipients of the reference can do with the object to which the reference points. A plurality of permissions can be included in a set of permissions. In an example used throughout the disclosure, three permissions are included in the set. More particularly, the permissions include an immutable permission, a read permission, and a write permission. For example, an immutable reference points at objects possibly-shared between concurrent threads where state that does not change is accessed through the reference. A read reference points at objects possibly-shared between concurrent threads for which there are no concurrent writes. And a write reference points to an object that is one of not shared or shared but includes an exclusive access.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
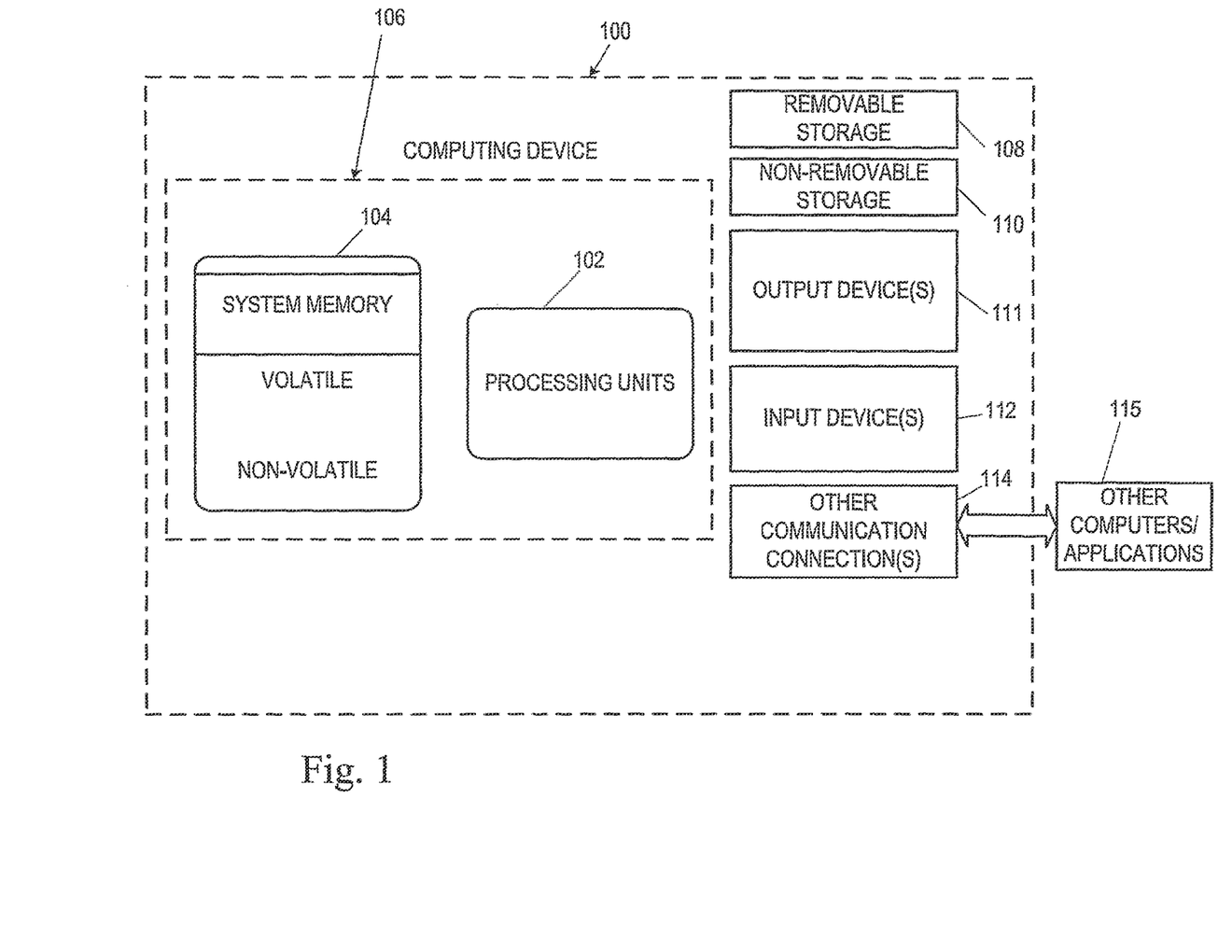
FIG. 1 is a block diagram illustrating an example computing system.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing system 100 can be configured to run an operating system software program and one or more software applications, which make up a system platform. In one example, the computing system 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment. The managed environment typically includes a virtual machine that allows the software applications to run in the managed environment so that the developers need not consider the capabilities of the specific processors 102.

The runtime is used only as an example. The embodiments of the disclosure below are not, however, confined to be used in a managed execution environment and are not confined to any runtime requirement. Rather, the embodiments are implemented in a type system. Accordingly, it is contemplated that embodiments can be implemented in C++ or other native code.

Figure 2:
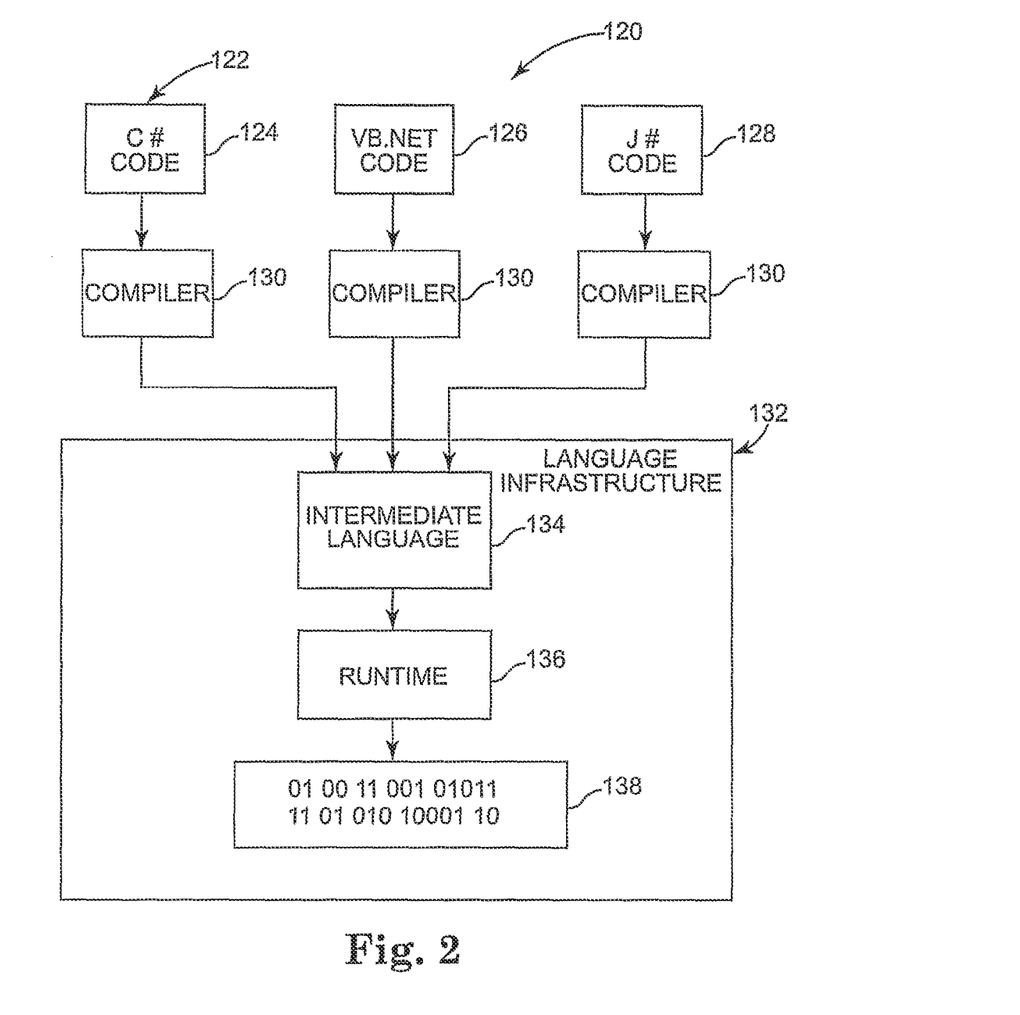
FIG. 2 is a block diagram illustrating one example embodiment of a managed environment operating on a computing system, such as the computing system of FIG. 1.

FIG. 2 illustrates an example embodiment of a managed, or runtime, environment 120 suitable for operation with a computing device, such as the computing device 100. Particular current examples of managed environment frameworks include that sold under the trade designation of .Net from Microsoft Corp. of Redmond, Wash., United States, and Java from Sun Microsystems, Inc. of Santa Clara, Calif., United States, as well as others. The managed environment 120 is configured to accept programs written in a high-level compatible code of one or more programming languages 122. For example, the managed environment can accept programs written in programming languages such as C-sharp (C#) code 124, a visual basic type language such as VB.NET code 126, and a Java type language (such as J-sharp) 128. Compilers 130 are configured to compile each compatible code 124, 126, 128. The compiled code can be provided to an infrastructure 132 that describes an executable code and a runtime environment that describes a number of runtimes. An example infrastructure is Common Language Infrastructure (CLI). The infrastructure includes a second compiler 134 that receives the compatible languages and compiles them to a second and platform-neutral intermediate language, such as Common Intermediate Language (CIL). The intermediate language is provided to a runtime compiler 136, such as the Microsoft Common Language Runtime (CLR) in the .NET framework, that compiles the intermediate language into a machine readable code 138 that can be executed on the current platform or computing device.

To enable the runtime to provide service to the managed code, language compilers emit metadata that describes, among other things, the types in the code. A great majority of programming languages explicitly include the notion of "data types" and "type systems" although different languages may include different terminology to describe these features. A data type is an attribute of a corresponding data that describes some features about the data such as the set of legal values and allowable operations on the values. A data type is metadata for the corresponding data. A type gives meaning to data because hardware of the computing device 100 does not make a distinction between memory addresses, instruction code, integers, floating point numbers, and the like. A type system associates the type or types with each program value and attempts to prove that no program errors occur. This is often verified with the language complier 136, such as the C# compiler, CLR verifier, or C++ compiler.

The disclosed examples below describe a platform-wide capability for controlling side effects through an additional subset of the type system. Side effects are permitted when state is confined within a thread, which permits a form of concurrency safety without synchronization. Isolation support enables the type system to create methods that remain in a state that existed prior to a method call and permission to mutate certain states (passed as arguments) in other methods. In the examples, an object reference can be tagged with an isolation permission modifier from a set of a plurality of isolation permission modifiers, stating what recipients of the reference can do with the object.

Other examples of controlling side effects exist, but none involve effect permissions to be carried out on individual references. Effects systems try to categorize the side effects allowed with a particular method. Functional programming languages, like Haskell, approach the problem in a wholly different way because they disallow side-effects altogether. Haskell allows for the simulation of side-effects using a "state monad"—modeled completely differently than usual function calls and statements, and often combined with the do combinator. This provides the illusion of an imperative style of programming, but it is modeled inefficiently and awkwardly with functional monads and continuations.

Unlike the Haskell example provided above, the disclosed examples operate on imperative programming languages such as C++, C#, and Java. Imperative programming is a computer programming paradigm that describes computation as a series of statements that change a program state, modeling the real capabilities of traditional von Neumann architectures more directly. Imperative programming can be contrasted with functional programming, which avoids state and mutable data. For example, purely functional programs have no side effects, which are modifications of some state while returning a value. On the other hand, a purely functional program can do nothing because without side effects a program accepts no input, produces no output, and does not interface with external devices. Imperative programming uses side effects to implement state and input/output functions.

Figure 3:
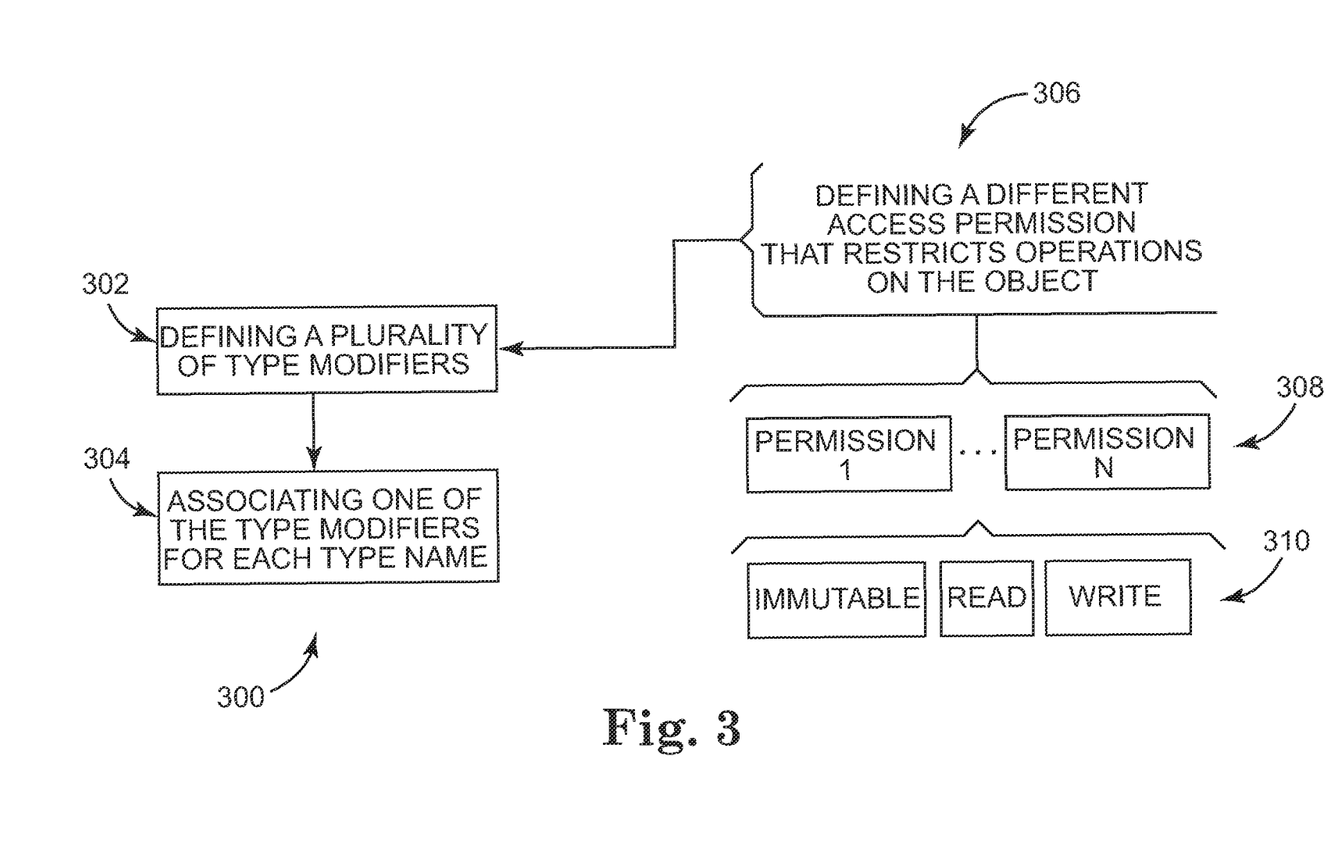
FIG. 3 is a flow diagram illustrating an example embodiment of a method of a managed environment, such as the managed environment of FIG. 2.

A general example of the present disclosure includes state isolation and definition of methods that preserve state isolation through type permissions. FIG. 3 illustrates an example embodiment of a method 300 that can be implemented as part of a language complier, such as the runtime environment or a managed framework on the computing device 100. Method 300 includes defining a plurality of type modifiers for controlling access to members through references pointing at an object at 302. One of the type modifiers is associated with each type name at 304. Rather than just listing <type Name>, the system provides a tuple of <typeName, modifier> where "modifier" can be a permission. An aspect of defining a plurality of type modifiers includes defining a different access permission that restricts operation on the object at 306. When used with a type or isolated method, the type permission restricts what can be done to an object graph to which it points. The type permissions include at least two isolation modifiers at 308, such as "immutable" and "mutable," to control access to members through references. Of course, more than two modifiers are possible.

In one example, three isolation modifiers are used including "immutable," "read," and "write" at 310. (More than three isolation modifiers are also contemplated, to restrict what can be done to objects.) An immutable reference points at an object possibly-shared among concurrent threads, but the state accessible through this modifier is statically proven to never change. A read reference also points to an object possibly-shared among concurrent threads, but no concurrent writes are permitted while such read references exist. In one example, this can include immutable access as well as reads of mutable fields. A write reference points either at an object that is not concurrently shared with another thread or at a shared object that has been provided with exclusive access so that writing can be done safely by the holder of such a reference.

A more particular example of the immutable-read-write permissions includes immutable-only, read-only, and read-write. An immutable-only (i) permission can be used only to read from immutable members. The object can be freely shared across threads and accessed concurrently, and the object will not incur concurrency issues. A read-only (r) permission can be used to read from any member, including mutable fields. The object may be unshared, or some form concurrency safety may be in place to allow concurrent reads. For example, a read lock can be held by a thread or some static control over references will cause the member to be free from concurrent writes. Or an object with read-write (w) permissions can be shared as read-only (r) across a fork-join barrier with structured data parallel constructs. A read-write (w) permission can be used to write to any member, and can include members with mutable fields. Some form of concurrency safety is in place to allow the writes. For example, an exclusive lock can be held, or the object is confined within a single thread.

The isolation permissions can make use of immutable fields, or single-assignment-values, in an imperative programming language, such as that described in U.S. patent application Ser. No. 12/163,868 to J. Duffy and A. Hejlsberg titled "Immutable Types in Imperative Language." As described, an immutable type is one where post-construction changes are not possible. One example used to establish an immutable type in an imperative language is the creation of support for "initonly" fields. Initonly indicates that variable assignment can only occur as part of the declaration or in a static constructor in the same class. An initonly field is one that is not written to once the object on which that field resides has been fully constructed. In this context, fully constructed means the constructer of the object has finished executing. Imperative languages can include a type system support that verifies this property, such as with the Common Language Runtime, and reject programs that do not adhere to the rules. An example of support for initonly fields includes "readonly" in the C# programming language.

Each occurrence of a type "T" can be associated with one of these modifiers in many numbers of ways. In one example, the notation T:x, is used where x is one of the isolation modifiers. In an example of three isolation modifiers, x can be: i=immutable-only, r=read-only, and w=read-write. For simplicity, the example notation T:x is used throughout the disclosure, but it is contemplated that other notations can be used. A program can specify an isolation modifier in any context where a type is to be named. Examples in a universal syntax, i.e., without regard to any specific programming language, using the notation T:x include:

a formal parameter declaration: void f(T:x foo) { . . . }.
a local variable declaration: void f( ) {T:x foo; . . . }
a field (state or instance) declaration: class C {private T:x m_foo; . . . }
a generic type parameter: class C<T> { . . . } void f( ) {C<T:x> foo; . . . } as well as others. Arrays can also be denoted as such, e.g. T:x[ ]:y.

The examples above can be implemented in a number of ways, some of which are pointed out here. In one implementation, the default access modifier is immutable or immutable-only (i) so that an unadorned type T is equivalent to T:i. Of note is that the isolation regions map to program scopes, however, and that program code outside of the isolation region can ignore the permission annotations in some implementations. This can serve to broaden the application of the isolation permissions as well a providing a runtime that is legacy friendly for existing code. In one implementation, static variables of type T are "T:i" because the static variables are shared. In pass-by-value, the compiler copies the value of an argument in a calling function to a corresponding non-pointer or non-reference parameter in the called function definition. The parameter in the called function is initialized with the value of the passed argument. As long as the parameter has not been declared as constant, the value of the parameter can be changed. But the changes are only performed within the scope of the called function only. The changes have no effect on the value of the argument in the calling function. Other implementations include returning objects with read-write permissions using intermediate language (IL) keywords. For example, the "newobj T" keyword returns an object of the type "T:w". The "newarr T" keyword returns an object of the type of the type "T[ ]:w".

In one implementation, the permissions are additive. For example, write (w) implies read (r), and read (r) implies immutable (i). In other words, T:w is effectively equivalent to T:irw, and T:r is effectively equivalent to T:ir. Thus, permissions can be removed safely, where T:w implicitly coerces to T:r, and T:r implicitly coerces to T:i. Thus, (w) can be considered a stronger permission than (r), or (r) is weaker than (w).

With the isolated permissions, concurrency safety can be extended to methods with an "isolated" method modifier, which indicates that the isolated method respects the isolation permissions. In one example, code of an isolated method "M" follows the isolation permissions. For instance, mutable fields in the type may not be read or written to for (i) references and may not be written to for (r) references. In some examples, M will not call non-isolated methods or invoke non-isolated delegates. During method or delegate invocation, M supplies actual input parameters that have the same or stronger permissions as their corresponding formal parameters. M supplies actual output (byref) parameters with permissions that are identical to the corresponding formal parameters during method and delegate invocations because byrefs can be used for reading and storing. M stores references that are access compatible with the target storage location type such as if the storage location has the same or weaker permission than the source reference. Further, when M overrides a virtual method or implements an interface method, (1) all input (non-byref) parameters have the same or weaker permissions than the member declaration formals; (2) all byref parameters have identical isolation modifiers, and (3) the return type includes a permission modifier that is the same or stronger than the permission modifier of the return type of the member declaration. With these rules, M does not reveal references that may violate isolation permissions and thus access permissions remain valid for an entire method callgraph.

The following pseudo code is used as an illustration:

```
class C {
    private T:w m_f;
    public C( ) { m_f = new T( ); }
    public isolated:r T:r Get ( ) { return m_f; }
    public isolated:w void Set(T:w obj) { m_f = obj; }
}
```

The field m_f is marked with a T:w permission, and receives and store via the "Set" method objects that have T:w permission. Any exposure of the internal object is done with a T:r permission via the "Get" method, and this is possible because T:w implicitly coerces to T:r. The notational convention of "isolated:x" is used to denote the hidden "this" argument of the method has the permission x, so in the example "Get" operates with "this:r" and "Set" operates with "this:w." Non-isolated methods can ignore access modifiers. Code at the boundary of the non-isolated code and isolated code coerces unadorned "T" references such that they include the appropriate permission modifiers.

An "isolated" delegate type "D" binds to an "isolated" method "M" where input and output parameters are access compatible with the delegate parameter. Establishing isolated delegates is similar to (but reversed) overriding virtual methods and implementing interface methods as described above. More particularly, input (non-byref) parameters can be stronger than the parameters of the target, byref parameters match permissions, and return type parameters can be weaker than the parameters of the target.

For example, given a method "isolated void M(C:r c)" the following delegate types are evaluated as whether they are legal to bind against the method:
isolated delegate void A(C:w c); // Legal as strengthening.
isolated delegate void B(C:r c); // Legal as precise.
isolated delegate void C(C:i c); // Illegal as weakening.

Generics are also capable of respecting modifiers. For example, consider a generic delegate "isolated delegate U IsolatedFunc<T, U>(T e);" the actual parameters for "T" and "U" determine the methods it can bind itself to:

```
Example 1
isolated static C:r M(C:r c);
...
IsolatedFunc<C:r, C:r> a = M; // Legal as precise.
IsolatedFunc<C:w, C:r> b = M; // Legal as strengthening the input
  (covariance).
IsolatedFunc<C:r, C:i> c = M; // Legal as weakening output
  (contra-variance).
IsolatedFunc<C:w, C:i> c = M; // Legal as both
Example 2
isolated static C:r M(C:r c);
...
IsolatedFunc<C:i, C:w> c = M; //Illegal as co- and contra-variance
  are opposite.
```

Language authors are provided with the decision as to whether to support covariant and contra-variance similarly to overrides of methods as noted above.

During member access, the permissions of the contained expression type are combined with declared access permission of the member. For example, given a member access "o.M" where "o" is a reference of type "T:x" and "M" has a declared type of "U:y," the type of statement "o.M" will be U:min(x, y) where the resulting reference is no stronger than the weakest permission of the combination. In other words, given a T:x reference, any field U:y or value returned from a method U:y are morphed into U:min(x, y) such as:

$$\{T:w+U:r\}=U:r$$

$$\{T:r+U:w\}=U:r$$

$$\{T:w+U:w\}=U:w$$

These rules provide permissions granted to a single reference will also apply to the object graph reachable for that reference. For the example of a "Customer" type:

```
class Customer {
    puplic Order:w _order = ...;
}
``` and an instance from a context of read access:
Customer:r c= . . . ;
These rules provide that no writes to the _order are allowed:
c._order._total= . . . ; // error: _order is erased to Order:r, not Order:w
In another example, the system permits the ability to suppress checks for a region of code to enable preferred side-effects.

Byrefs—such as "out" and "ref" parameters—to fields are similar with the exception that the resulting type will become U&:min(x, y) instead of U:min(x, y). The "&" in this instance means "reference to a 'U' [reference]." This byref rule protects against a possible elevation of privilege with a common practice of avoiding copying by accessing value type fields through byrefs.

The system further includes an ability to constrain generic type parameters. For example in the case where System.Object contains a method 'void isolated:r Equals(object:r other) '. If we write a List<T> class that checks two objects for equality (perhaps as part of implementing a 'bool isolated:r Contains(object:r obj)' method), it declares that T is at least readable, which can lead to:
T: immutable
T: immutable+
T: readable−
T: readable
T: readable+
T: writable−
T: writable Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer readable storage medium, which is not a transitory propagating signal, storing computer executable instructions for controlling a computing device to perform a method comprising:

defining a plurality of type modifiers for controlling access to type members through references pointing at an object in a shared-access memory; and associating one of the plurality of type modifiers with a type name for all concurrent occurrences of the type name, wherein each of the plurality of type modifiers defines a different access permission to restrict operations on the pointed-to object to which the reference points, the access permissions including:

an immutable permission allows the pointed-to object to be shared among concurrent threads wherein changes to the pointed-to object are confined to the scope of a called function but the state of the pointed to object is statically determined not to change in a calling function;

a read permission allows the pointed-to object to be shared among concurrent threads with concurrency safety for concurrent reads;

a write permission does not allow the pointed-to object to be shared among concurrent threads; and defining an isolated method as the called function that obey the access permissions.

2. The computer readable storage medium of claim 1 wherein the method specifies the type modifier in a context of a type.

3. The computer readable medium of claim 2 wherein the type modifier may appear on one of a formal parameter declaration, a local variable declaration, an instance field declaration, a static field declaration, and a generic type parameter.

4. The computer readable storage medium of claim 1 wherein an immutable reference points at objects possibly-shared between concurrent threads where state that does not change is accessed through the reference; wherein a read reference points at objects possibly-shared between concurrent threads for which there are no concurrent writes; and wherein a write reference points to an object that is one of not shared or shared but includes an exclusive access.

5. The computer readable storage medium of claim 4 wherein a single-assignment-value is accessed through an immutable permission.

6. The computer readable storage medium of claim 4 wherein a read reference implies immutable access and allows reads of mutable fields.

7. The computer readable storage medium of claim 4 wherein a write to the reference can be done with safe concurrency.

8. The computer readable storage medium of claim 1 including combining the access permissions to protect an object graph with the access permission of a root reference.

9. The computer readable medium of claim 8 wherein the reference resulting from the combination will not be stronger than the weakest permission of the combination.

10. The computer readable storage medium of claim 1 including constraining generic type parameters.

11. A system, comprising:
a computing device having a shared-access memory supporting a plurality of threads; and
an imperative framework operably coupled to the computing device, where in the imperative framework includes a plurality of type modifiers configured to control access to type members through references that point at an object in the shared-access memory;
wherein one of the plurality of type modifiers is associated with a type name for all occurrences of the type name;
wherein each of the plurality of type modifiers defines a different access permission to restrict operations on the object to which the reference points, the access permissions including:

an immutable permission allows the pointed-to object to be shared among concurrent threads wherein changes to the pointed-to object are confined to the scope of a called function but the state of the pointed to object is statically determined not to change in a calling function;

a read permission allows the pointed-to object to be shared among concurrent threads with concurrency safety for concurrent reads; and a write permission does not allow the pointed-to object to be shared among concurrent threads; and wherein an isolated method is defined as the called function to obey the access permissions.

12. The system of claim 11 wherein an immutable reference points at objects possibly-shared between concurrent threads where state that does not change is accessed through the object; wherein a read reference points at objects possibly-shared between concurrent threads for which there are no concurrent writes; and wherein a write reference points to an object that is one of not shared or shared but includes an exclusive access.

13. The system of claim 12 wherein the immutable permission is associated with an immutable field.

14. The method of claim 12 wherein the read permission is associated with a read lock.

15. The system of claim 12 wherein the write permission is associated with an exclusive lock.

16. The system of claim 11 wherein the type modifiers are specified in a context of a type.

17. The system of claim 11 wherein the imperative framework includes an isolation region defined with the access permissions and an other region outside of the isolation region, wherein the isolation region maps to program scopes, and wherein the other region is configured to selectively ignore access permissions.

18. The system of claim 11 wherein the imperative framework includes isolated methods capable of respecting the access permissions.

19. The system of claim 18 wherein the imperative framework includes isolated delegates that bind to isolated methods having input and output parameters access compatible with delegate parameters.

20. A computer readable storage medium, which is not a transitory propagating signal, storing computer executable instructions for controlling a computing device to perform a method comprising:
defining at least three type modifiers for controlling access to type members through references pointing at an object in a shared-access memory; and
associating no more than one of the plurality of type modifiers with a type name for all occurrences of the type name;
wherein each of the plurality of type modifiers defines a different access permission to restrict operations on the object to which the reference points including:
an immutable permission, which allows the pointed-to object to be shared among concurrent threads wherein changes to the pointed-to object are confined to the scope of a called function but the state of the pointed to object is statically determined not to change in a calling function;
a read permission, which allows the pointed-to object to be shared among concurrent threads with concurrency safety for concurrent reads, and a read reference implies immutable access and allows reads of mutable fields; and a write permission, which does not allow the pointed-to object to be shared among concurrent threads, wherein a write to the reference can be done with safe concurrency; and defining an isolated method as the called function to obey the access permissions.

* * * * *